Fig-1

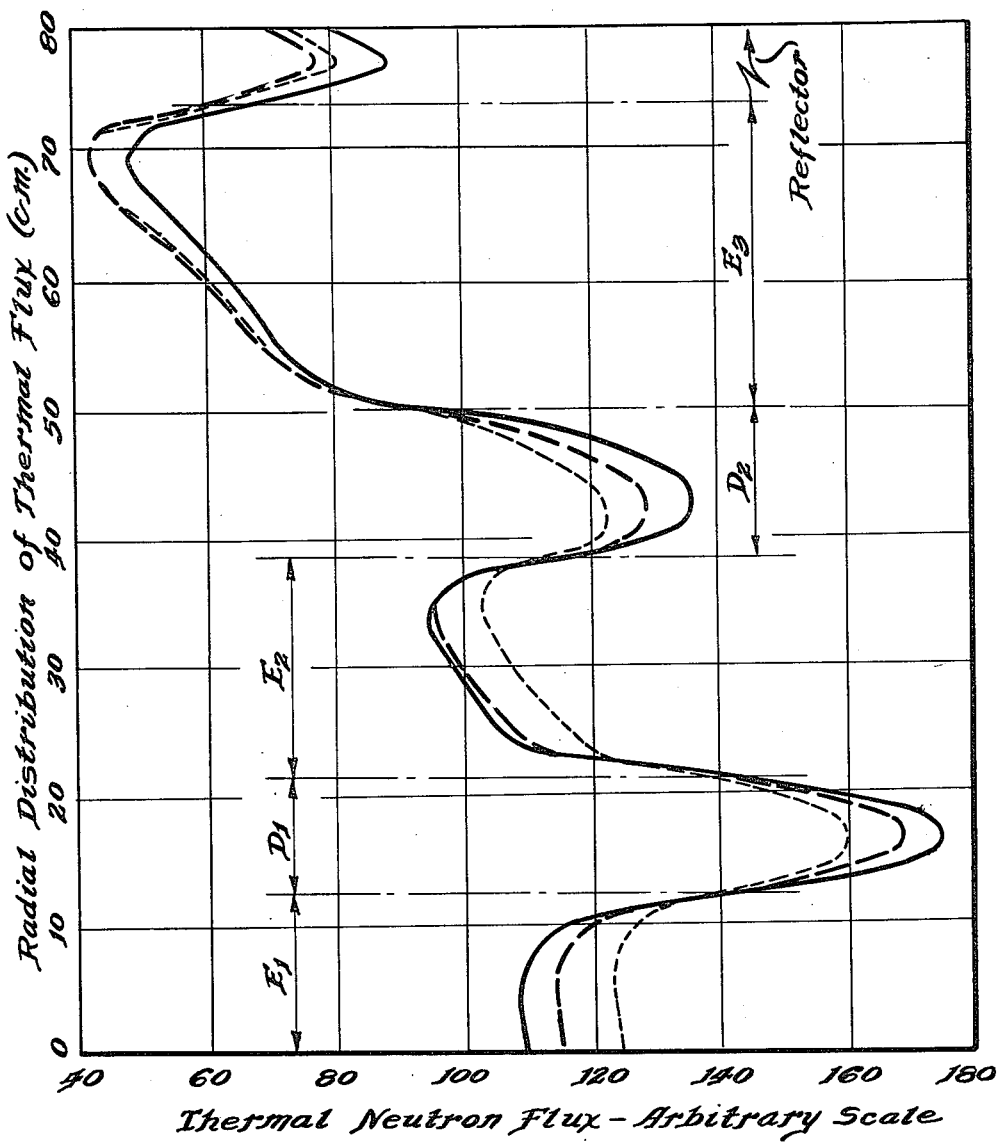

United States Patent Office 3,141,827
Patented July 21, 1964

3,141,827
BREEDER REACTOR CORE WITH ALTERNATE ZONES OF DEPLETED AND ENRICHED FUEL
Haig P. Iskenderian, Elmhurst, Ill., assignor to the United States of America as represented by the United States Atomic Energy Commission
Filed Oct. 12, 1962, Ser. No. 230,302
7 Claims. (Cl. 176—17)

This invention relates generally to thermal nuclear-reactor cores. In more detail the invention relates to a novel arrangement of enriched and depleted fuel elements in a thermal nuclear-reactor core to obtain increased core life and greater neutron economy.

Reactors designed to operate over a considerable period of time must contain a considerable excess of fissionable material over that amount just necessary to sustain a chain reaction. Additional control—known as shim control—is provided to compensate for this excess reactivity. Shim control is conventionally obtained by the use of movable control elements or by the inclusion of a burnable poison in the core. Both of these alternatives usually have the undesirable result that a considerable number of neutrons are lost by capture in a nonproductive absorber.

In a reactor incorporating a large excess of fissionable material, it is possible that a local region of the reactor might contain sufficient fissionable material to be critical with all control rods in position in the cold core. Such a reactor obviously could not be controlled without employing a burnable poison in the reactor. It is, of course, essential that local criticality be prevented in the cold core and it is desirable from the standpoint of neutron economy that no burnable poison be employed.

It is accordingly an object of the present invention to develop a thermal nuclear-reactor core having a long lifetime and good neutron economy.

It is another object of the present invention to so arrange enriched and depleted fuel elements in a nuclear-reactor core as to lengthen the life of the core.

It is a further object of the present invention to develop a thermal nuclear-reactor core incorporating a novel form of shim control.

It is also an object of the present invention to develop a thermal nuclear-reactor core having a long life and good neutron economy wherein local criticality is avoided.

These and other objects of the present invention are attained by employing depleted fuel elements to obtain shim control in the reactor. The depleted fuel elements absorb neutrons to produce additional fissionable material. The depleted fuel elements are so located in the reactor as to obtain maximum benefit from the fissionable material produced therein and at the same time eliminate local criticalities. This is accomplished broadly by interspersing depleted elements among slightly enriched elements and more particularly by providing several concentric shells or zones of depleted elements separated by shells or zones of slightly enriched elements surrounding a central zone of slightly enriched elements.

By the term "slightly enriched fuel element" is meant a fule element containing slightly more fissionable material than is contained in natural uranium. Fuel elements containing up to about 5% fissionable material are considered to be slightly enriched. By "depleted fuel element" is meant a fuel element containing less fissionable material than is contained in natural uranium and by "fissionable material" is meant a material fissionable by neutrons of thermal energy such as U–235 or Pu–239.

The reactor selected to illustrate the present invention is a boiling-water reactor of the experimental boiling water reactor (EBWR) type. For complete details on the EBWR, reference is made to report No. ANL–5607 which is available from the United States Government Printing Office. A reactor of this type is also disclosed in patent No. 3,122,484, issued February 25, 1964, in the name of the present inventor. Fuel element dimensions and other details left out of this application are identical to the details given in these writings.

The invention will next be described in connection with the accompanying drawing wherein:

Figure 1:
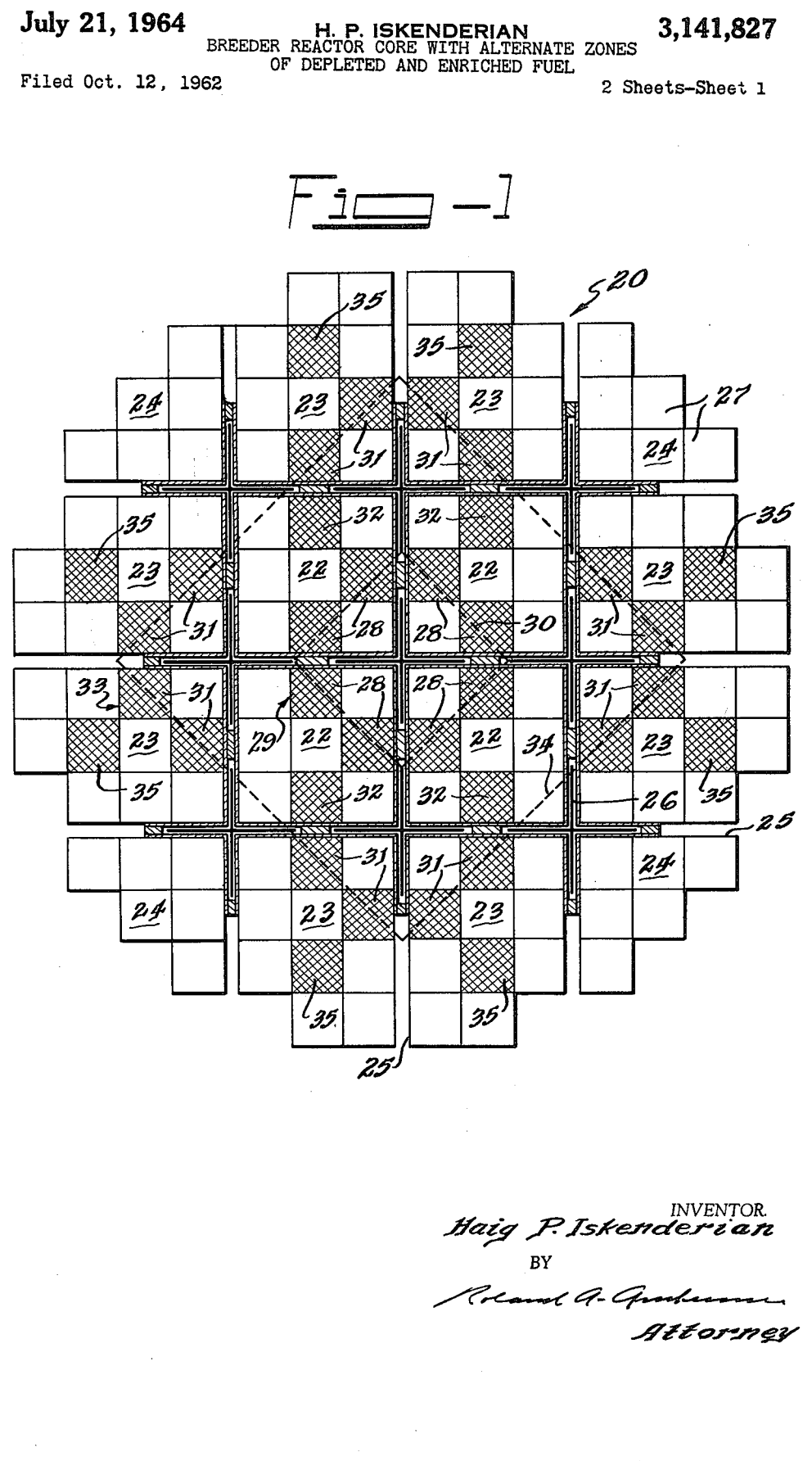

FIG. 1 is a schematic plan view, partly in section, of a nuclear-reactor core constructed according to the present invention, and FIG. 2 is a graph showing the radial flux distribution in a core according to a simplified form of the present invention.

As shown in FIG. 1, core 20 comprises 148 fuel elements which are square in cross section and which are symmetrically arranged to approximate roughly the shape of a circular cylinder. Core 20 is broken into four central groups 22 each containing nine fuel elements, eight exterior groups 23 each containing eleven fuel elements and four corner groups 24 each containing six fuel elements by channels 25 within which are disposed nine cross-shaped control rods 26 located at the intersections of the fuel element groups.

The invention in the present case arises from the particular distribution of slightly enriched and depleted fuel elements employed in the reactor core. This distribution is shown in FIG. 1 wherein enriched fuel elements are unshaded and depleted fuel elements are crosshatched. There are 112 enriched uranium fuel elements 27 in core 20 and 36 depleted uranium fuel elements. Eight depleted uranium fuel elements 28 are arranged symmetrically around four enriched elements 27 to form an inner shell 29 of depleted elements which is generally square in shape as shown by dashed line 30. Also sixteen depleted fuel elements 31 and four depleted fuel elements 32 are arranged symmetrically around inner shell 28 to form an outer shell 33 of depleted elements which is generally square in shape as shown by dashed line 34. As shown, the four depleted elements 32 in the outer shell 33 are out of place. This is so that each control rod 26 will be located at the center of a square of four enriched fuel elements 27.

There are also eight depleted fuel elements 35 located outside of the outer shell 33. The location of these elements 35 is not as important as is the location of the other depleted fuel elements but elements 35 form a partially complete shell of depleted elements wherein some of the benefit obtained by the other depleted elements is attained. Elements 35 also serve to break up any possible regions of local criticality near the periphery of the core.

It is thus evident that the depleted uranium fuel elements are arranged to form a reactor having a central zone of enriched fuel which is surrounded by alternate zones of depleted and enriched fuel. By this arrangement a peak thermal flux will occur in the depleted elements resulting in an increased conversion of U–238 to Pu–239.

The described arrangement of depleted and enriched elements makes it possible to obtain maximum worth of the control rods; it breaks up local criticalities; and it also results in near optimum flux peaking in the depleted elements. It is by surrounding depleted elements on at least three sides with enriched elements that flux peaking in the depleted elements is obtained. This occurs because neutrons impinge on the depleted elements from at least three directions. Other arrangements that would be a little less satisfactory from the standpoint of flux peaking or of breaking up local criticalities include cylindrical shells of cylindrical depleted fuel elements, hexagonal shells of hexagonal elements and concentric square shells of square fuel elements disposed side-to-side because the depleted elements would not be surrounded on at least three sides with enriched elements.

Calculations have been made on an operating reactor model comprising the cylindrical equivalent of the reactor core described above. Parameters of the EBWR as given in the above-mentioned report and patent application were employed in the computation. In addition an enrichment of 2.7% for the enriched uranium elements and 0.4% for the depleted uranium elements was specified. FIG. 2 shows the radial distribution of thermal neutron flux in this reactor model. In this FIGURE, $E_1$ is the radius of the central enriched zone, $D_1$ is the width of the first shell of depleted elements, etc. As shown the thermal neutron flux reaches a maximum in each of the depleted uranium shells. The calculated initial $k_{eff}$ for this reactor is 1.028; it has a $k_{eff}$ of 1.050 after a burnup of 1065 megawatt days per metric ton and a $k_{eff}$ of 1.032 after a burnup of 7000 megawatts days per metric ton. Thus the reactor retains a relatively constant reactivity over a relatively long period of operation. The life of the reactor is therefore greatly increased over a reactor incorporating only enriched elements without additional control.

The increased reactivity of the reactor is due to the fact that the plutonium produced in the depleted uranium more than makes up for the fuel lost by depletion of the enriched fuel. Because of the arrangement the plutonium in the depleted fuel has a higher importance—that is, a higher effect on reactivity—than has the U-235 in the enriched fuel. This follows because the plutonium produced in the depleted elements is in a zone of high thermal flux.

It will be appreciated that higher reactivity can be obtained by substituting enriched fuel elements for depleted elements or by increasing the enrichment. However, such a reactor would be less efficient than the herein-described reactor because additional shim control in the form of movable absorbers or burnable poison would have to be added.

With an enrichment of 2.7% in all elements it is possible that a group of nine or eleven fuel elements might be critical with the reactor cold and all control rods in. Such a reactor obviously would require additional control. To reduce the reactivity three depleted elements are included in each of groups 22 and 23. Groups 24 at the corners of the reactor are not large enough to become critical. Since control rods are fully inserted in the cold condition, other groupings of fuel elements including a control rod in the interior thereof cannot be critical and need not be considered.

The location of the three depleted elements in each group of elements is determined by the sometimes conflicting requirements discussed above. First, all control rods 24 should be at the center of four enriched elements and, second, the depleted elements are best arranged surrounded by at least three enriched elements. Thus two of the three depleted elements in each group 22 or 23 are disposed in diagonal relationship in the group adjacent to the control rod channels 25. The location of the third is relatively immaterial except that it should not be located next to one of the other depleted elements in the group and cannot be located next to a control rod. As shown, some of the depleted elements in one group are located next to a depleted element in another group. These elements best serve to break up local criticalities in the positions shown in the drawing. For example, relatively large groups of enriched elements crossing a control rod channel but not a control rod would be found in the design if the eight outermost depleted elements were not present or were disposed closer in to the center of the core.

By the described arrangement depleted elements are in general surrounded by enriched elements resulting in the flux peaking effect in the depleted elements which has been previously described and enriched elements are in general surrounded by depleted elements resulting in the elimination of local criticalities in the cold reactor.

It will be apparent that to obtain the benefits of the present invention it is necessary to balance the relative enrichment of the enriched and depleted fuel elements and the relative number of enriched and depleted fuel elements. The first consideration is that enrichment and number of the enriched fuel elements be sufficient for criticality. The enrichment and number of enriched fuel elements must not be so great that the excess reactivity can only be overcome by conventional shim control rather than according to the present invention. Thus these fuel elements should be slightly enriched—on the order of 2 to 5% enrichment. For a given enrichment of the enriched elements there will be an optimum enrichment of the depleted elements which can be calculated. The relative number of depleted elements cannot be substantially greater than that shown without reducing initial reactor power objectionably.

About the only disadvantage of the disclosed arrangement of fuel elements is the initial reduction in power caused thereby. This situation is initially somewhat improved in view of the relatively high thermal neutron flux in the depleted elements. Furthermore, the power developed in these depleted elements is soon increased with burnup by virtue of their high conversion ratio and the high flux therein. This follows because there is little competition for neutrons in the depleted uranium. Most of the neutrons are absorbed by U-238 to form plutonium rather than cause fissions in U-235. With build up of plutonium, the latter will naturally claim their share of the neutrons.

Although the invention has been described specifically with respect to enriched and depleted uranium as fuel, it is not restricted thereto as other materials can be used. For example, a fuel enriched in plutonium can be used as the enriched material and thorium can be used as the depleted material. In addition the invention is not applicable only to boiling water reactors but can also be employed with advantage in any thermal reactor. It should also be noted that the particular pattern shown in the drawing can be extended to larger reactors.

It will be understood that the invention is not to be limited to the details given herein but that it may be modified within the scope of the appended claims.

What is claimed is:

1. A nuclear-reactor core incorporating a symmetric array of square fuel elements and a plurality of cross-shaped control elements symmetrically distributed around a central control rod wherein said fuel elements are disposed in four central groups of nine elements each, eight exterior groups of eleven elements each disposed around the four central groups and four corner groups of six elements each, the control rods being located in control rod channels which separate the said groups at the corners of the fuel element groups, and each of said central and exterior groups contains three depleted uranium fuel elements, the remaining fuel elements being slightly enriched in U-235, two of the depleted elements in each group being disposed in diagonal relationship adjacent to the control rod channels, the remaining depleted element being disposed in the groups in diagonal relationship to one of the other depleted elements.

2. A core for a boiling-water reactor comprising a symmetric array of 148 square fuel elements and nine cross-shaped control rods arranged as follows:
  (a) four central groups of nine fuel elements each, eight exterior groups of eleven fuel elements each and four corner groups of six fuel elements each are separated by control rod channels,
  (b) cross-shaped control rods are disposed in the control rod channels at the intersections of the channels,
  (c) each central group of nine and exterior group of eleven fuel elements contains three fuel elements containing uranium depleted to the extent it contains only 0.4% U–235, the remaining fuel elements containing uranium enriched to 2.7% in U–235, (d) two of the three depleted elements in each group are disposed in diagonal relationship adjacent to control rod channels as close to the center of the core as possible, (e) the third depleted element is disposed in diagonal relationship to one of the other depleted elements in the position nearest to a center line of the reactor.

3. A nuclear reactor core comprising a central zone of slightly enriched fuel, a plurality of alternate concentric zones of depleted fuel and zones of slightly enriched fuel surrounding said central zone, and movable control rods disposed in the core in a regular pattern wherein said central zone is square in cross section, said depleted zones are generally square in cross section, and the fuel elements forming the depleted zones are quadrangular in cross section and are surrounded on at least three sides by fuel elements from the slightly enriched zones.

4. A nuclear reactor core according to claim 3 wherein the control rods are cross-shaped and are each disposed at the center of four slightly enriched fuel elements.

5. A nuclear reactor core according to claim 4 wherein a plurality of depleted fuel elements are disposed outside of the outermost depleted zone to break up regions of local criticality.

6. A nuclear reactor core according to claim 5 wherein all fuel elements are square in cross section and four slightly enriched elements make up the central zone, there are eight depleted fuel elements in an innermost depleted zone, twenty depleted fuel elements in an outermost depleted zone and eight depleted elements outside of the outermost depleted zone.

7. A nuclear reactor according to claim 6 wherein uranium is the fuel and the depleted uranium contains 0.4% U–235 and the enriched uranium contains 2.7% U–235.

References Cited in the file of this patent

Harrer et al.: Proceedings of 2nd Geneva Conf., 1958, vol. 9, pp. 264–269. "The EBWR Reactor."

De Huff et al.: Proceedings of 2nd Geneva Conf., 1958, vol. 8, pp. 47, and 57–60, "Design of the PWR."

Directory of Nuclear Reactors, 1959, vol. 1, pp. 21–26, "The Shippingport PWR Reactor."

Director yof Nuclear Reactors, 1959, vol. 1, pp. 53–58, "The EBWR Reactor."